United States Patent
Cheston et al.

(10) Patent No.: US 6,412,025 B1
(45) Date of Patent: Jun. 25, 2002

(54) APPARATUS AND METHOD FOR AUTOMATIC CONFIGURATION OF A PERSONAL COMPUTER SYSTEM WHEN RECONNECTED TO A NETWORK

(75) Inventors: Richard W. Cheston, Morrisville; Daryl Carvis Cromer, Apex; Dhruv Manmohandas Desai, Cary; Brandon Jon Ellison, Raleigh; Howard Jeffery Locker, Cary; Eric Richard Kern, Durham; David Rhoades, Apex; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,136
(22) Filed: Mar. 31, 1999
(51) Int. Cl.⁷ ............................ G06F 13/14; G06F 13/20
(52) U.S. Cl. ..................... 710/8; 709/220; 709/221; 709/222; 340/855.5; 370/438; 370/461
(58) Field of Search ................. 710/8; 370/438, 370/461; 340/855.5; 709/221, 220, 222

(56) References Cited

U.S. PATENT DOCUMENTS

| | | | | |
|---|---|---|---|---|
| 5,659,487 A | * | 8/1997 | Cho et al. ............... | 395/200.3 |
| 5,991,771 A | * | 11/1999 | Falls et al. ............... | 707/202 |
| 6,098,098 A | * | 8/2000 | Sadahl et al. ............ | 709/221 |
| 6,098,116 A | * | 8/2000 | Nixon et al. ............. | 710/8 |
| 6,105,028 A | * | 8/2000 | Sullivan et al. .......... | 707/10 |
| 6,111,886 A | * | 8/2000 | Stewart ................... | 370/438 |

* cited by examiner

Primary Examiner—Christopher Shin
Assistant Examiner—Rehana Perveen
(74) Attorney, Agent, or Firm—George E. Grosser; Carlos Munoz-Bustamante

(57) ABSTRACT

A system and method for connecting a computer terminal (e.g., a personal computer) to a data transmission network with the appropriate settings for connection obtained from the network if the terminal has been moved and the settings are not appropriate for the new location. The system and method involve detecting that the terminal has been removed from the data transmission network, and, if the terminal has been moved, checking to determine whether the previous settings are appropriate for use in the new location. If the settings are appropriate, then the previous settings are used; if not, new settings for the terminal are obtained from the network, using a program such as the IBM's Dynamic Host Connection Program (DHCP), with the details on the settings (or connection) maintained at both the network and the computer terminal and updated when a new or changed connection to the data transmission network is made.

7 Claims, 5 Drawing Sheets

Host log

| Device | Location | IP Address | Router | Primary Domain Server | Secondary Domain Server |
|---|---|---|---|---|---|
| T1 | plug1 | 9.171.21.22 | Router1 | 9.170.17.21 | 9.170.17.22 |
| T2 | plug2 | 9.171.21.23 | Router1 | 9.170.17.21 | 9.170.17.22 |
| T3 | plug3 | 9.171.21.24 | Router1 | 9.170.17.22 | 9.170.17.21 |
| T4 | plug4 | 9.171.22.21 | Router2 | 9.170.17.22 | 9.170.17.21 |
| • | | | | | |
| • | | | | | |
| • | | | | | |
| Tn | plug n | 9.174.33.31 | Router n | 9.170.11.11 | 9.170.11.12 |

FIG. 5

Terminal Log

| Location | plug | router | IP address | effective date | effective time | primary server |
|---|---|---|---|---|---|---|
| Current location | plug1 | router 1 | 9.171.22.21 | 120698 | 131540 | 9.170.17.21 |
| Previous location | plug4 | router 4 | 9.171.21.31 | 113098 | 080717 | 9.170.17.22 |
| 2nd previous location | plug 1 | router 1 | 9.171.22.21 | 112998 | 081756 | 9.170.17.21 |
| 3rd previous location | | | | | | |
| • | | | | | | |
| • | | | | | | |
| • | | | | | | |

FIG. 6

APPARATUS AND METHOD FOR AUTOMATIC CONFIGURATION OF A PERSONAL COMPUTER SYSTEM WHEN RECONNECTED TO A NETWORK

CROSS REFERENCE TO RELATED PATENTS

The present invention is related to a patent entitled "System and Method for Detecting When A Computer System Is Removed From a Network," Ser. No. 08/965,550 filed Nov. 6, 1997, (RP9-97-008) (now U.S. Pat. No. 6,021, 493) by Daryl C. Cromer et al. and assigned to the assignee of the present invention. This patent, which is sometimes referred to herein as the "LAN Leash Patent," is specifically incorporated herein by reference.

FILED OF THE INVENTION

The present invention relates to attaching computer terminals to a data transmission network. More specifically, the present invention is related to setting the attachment parameters of attached computer terminals and updating the settings when a computer terminal has become reattached to a network after having been removed from the network, either at the same location or at a different location, and in maintaining information as to the connection between the network and its terminals at both the terminals and the network.

BACKGROUND ART

Computer terminals for putting computing power on the desktop of a variety of users are well known in the art, as is connecting these computer terminals to a data transmission network to allow data and programs from other computers connected to the network to the network to be available to the user of an individual computer terminal.

One form of computer terminal that has been quite effective in connecting to a data transmission network for exchange of data and programs is the personal computer, particularly the IBM-brand personal computers. The personal computer typically includes a system unit with a single systems processor and memory, a display, at least one input/output device like a floppy disk drive, a hard drive or a printer/plotter. The personal computer advantageously includes means for attaching the personal computer systems processor to a data transmission network, a connection that may be made through any of a number of conventional physical and logical devices that are well known in the prior art such as a local area network, a token ring, or similar attachment mechanism.

The LAN Leash Patent discloses a system which monitors the continuity of connection between a personal computer and a data transmission network. When that connection is broken, even temporarily and even when the computer is not in a normal operating mode, a record is made of the break in connection and a network administrator is advised of the situation. The LAN Leash Patent discloses that the removal of a computer system from its connection to the data transmission network may be a cause for concern that a theft of the computer system may be in process, a growing concern since personal computers are becoming smaller and lighter, hence more easily transportable.

As the personal computer systems become more easily transportable and removable from the network, it becomes easier to relocate a personal computer from one place to another, either because the individual has changed offices or because the work has changed and the personal computer is moved to serve a new individual. A respected consulting organization which compiles and publishes information related to the computer industry has estimated that the typical personal computer attached to a data transmission network in a corporate environment will be moved three to five times during its useful life and that, using current procedures, each such move of a personal computer will cost the corporation an average of $200. Much of the cost of a move results from the labor to reconfigure the personal computer for its new attachment to the data transmission network. In some companies, with reorganizations, mission changes and other physical moves of employees, one out of two employees is moved each year.

This reconfiguration is typically accomplished by having a network specialist who knows the appropriate settings (addresses stored or set into the personal computer for use in attaching to the data transmission network) and the network configuration or how to find the settings and the network configurations so that a personal computer can be coupled to the network in its new location and with the appropriate settings.

The disconnection from (and reconnection to) the network may occur because the personal computer is being moved from one office to another or because the personal computer is being serviced. A connection to the network may also be broken if the computer is being removed, either with or without the owner's consent or knowledge. Some personal computers are mobile by design, as in the case of a laptop personal computer like the IBM ThinkPad personal computers, and the user frequently removes such computers from the network for traveling to a different work location with his personal computer. Even if a laptop computer is not being taken away from the premises on which a data transmission network exists, the laptop computer may be removed from the network when the user is away from the office in order to secure the laptop personal computer from being taken by others.

Once the personal computer has been removed from the data transmission network, it may be reattached to the network in the same place (as in a worker who removes his laptop computer from his office to take it to a field location or home, then returns the laptop computer to his same office), in a similar place (like in an adjacent office or down the hall) or in a completely different location. Some of the data transmission networks have a very wide geographic range, some extending to different parts of a single town, some extending across states and some data transmission networks may even be worldwide. The connections to such networks may vary from having one only a few servers to being international with hundreds or thousands of servers.

One setting for attaching a personal computer or other terminal to a data transmission network such as an Internet or Internet is an Internet Protocol (IP) address. This may be a fixed address or setting (set once for the duration of the attachment of a particular computer terminal to the network) or it may be a dynamic setting (an new address or setting which is acquired each time the personal computer is attached to the network). IBM offers a program product called Dynamic Host Connection Program (DHCP) to allow a personal computer to get a new IP address each time the personal computer issues a request of the network, an activity which can be programmed to happen each time the computer is turned on while attached to the network or each time the computer is attached to the Internet or the intranet. This program is simple, in concept, in that the personal computer or terminal sends a request to the data transmission network for a new IP address, and it receives from the network an IP address. Obviously, the system providing the IP addresses must know which IP addresses it has used (to avoid duplication) and which ones remain available for assignment. It would be desirable if the assignment of IP addresses knew which IP addresses were no longer in use so they could be reused (or the supply of IP addresses would be exhausted after a period of time).

In addition to setting the Internet Protocol (which is the address by which the network knows the terminal), the terminal requires that certain fields be set up for its use— fields like its "name server" and other values that are stored and referred to as "settings". Again, a network specialist who assists with the move of a personal computer can physically attend to changing the terminal settings when a personal computer or terminal has been moved from one location to another, but this is an expensive and time-consuming process.

Moving a computer terminal attached to a data transmission network typically required that the user coordinate with a network specialist to come to his new location to provide the new settings. This either requires an amount of advance coordination (to schedule the move when the network specialist is available) or waiting until the network specialist can provide his services. Since many corporate moves involve multiple office changes relatively simultaneously (when a first and second worker exchange offices, they both require service at the same time, and some moves of workers with their computer terminals involve hundreds of workers).

Accordingly, the practice of removing personal computers from the data transmission networks for whatever reason and then reattaching the personal computers to the data transmission network, sometimes in the same place, and other times in a new location, raises the question of whether the old settings will be effective for the computer to attach to the data transmission network and whether it will require a personal visit from a network specialist.

Other disadvantages and limitations of the prior art systems for attaching computer terminals to computer networks will be apparent to those skilled in the art of communication between computer terminals and computer networks in view of the detailed description of the preferred embodiment of the present invention taken together with the accompanying drawings and the appended claims.

SUMMARY OF THE INVENTION

The present invention overcomes the disadvantages of the prior art by providing a system for attaching computer terminals to a data transmission network which is simple and inexpensive without using unnecessary resources but which provides the correct settings for connection of the computer terminal to the data transmission network.

The present invention does not require the presence of a network specialist to reset the settings of computer terminals which have been moved to new locations on a data transmission network. This avoids the delays which would otherwise occur if the user could not start using his computer terminal in a new location until the network specialist came to his location to store the appropriate parameters in the computer terminal for the new location on the data transmission network.

A system for obtaining an Internet Protocol address for a terminal is known in the art. A computer program which generates such an IP address suitable for a terminal is the Host Data Control Program (HDCP). This provides an Internet Protocol address for a terminal in response to a request coming from that terminal.

In addition to an IP address the terminal needs to know its server—what computer in the network it will address with its requests, and which computer will be receiving its information for transmission to the terminal. Typically, a server serves a small number of terminals, and each network has a plurality of servers, and the server maintains address information—what computers are attached and where—so that information packets from the data transmission network may be properly distributed to the terminals as they arrive.

The present invention has the advantage that it seeks an Internet Protocol (IP) address when it needs one because the terminal has been moved, but it does not seek a new IP address when the computer terminal does not require a new IP address, as when the computer terminal has been reconnected in the same place or when the previous settings will continue to be effective for the new location.

By avoiding seeking an unnecessary new IP address, the system avoids adding an unnecessary load on the data transmission network. Since many users would turn on their terminals at about the same time (for example, at the beginning of a work day), if each user was requesting a new IP address at about the same time, the network could spend a lot of resources (use a lot of its capacity) in receiving and filling unnecessary requests for new IP addresses. Many computer terminals are not moved since the last use of the terminal, so therefore the IP addresses stored in the terminal would be usable without a change or without even contacting the network on the matter of the IP address.

The present invention, being a system in which new settings are provided through the network when needed, also mean that fewer network specialists will be needed to support the moving or computer terminals, avoiding the cost of such individuals and allowing them to spend their time more productively.

Other objects and advantages will be apparent to those skilled in the art in view of the description of he preferred embodiment and the appended claims and the accompanying drawings.

BRIEF DESCRIPTION OF THE DRAWINGS

Some of the objects of the present invention having been stated above, other objects and advantages will appear as the description of the present invention proceeds, when taken in conjunction with the accompanying drawings, in which:

FIG. 5 is an example of the host log showing the location of personal computers attached to the data transmission network.

FIG. 6 is an example of the log stored on the personal computer of FIG. 1 showing the history of its connection to the data transmission network.

DETAILED DESCRIPTION OF THE PREFERRED EMBODIMENT

While the present invention will be described more fully hereinafter with reference to the accompanying drawings in which the best presently-contemplated method for carrying out the present invention is shown, it will be understood at the outset of the description which follows that persons of skill in the appropriate arts may modify the invention herein described without departing from the favorable results of this invention. Accordingly, the description which follows is to be understood as being a broad teaching disclosure of the present invention directed to personal of skill in the appropriate arts and not as limiting upon the present invention.

Figure 1:
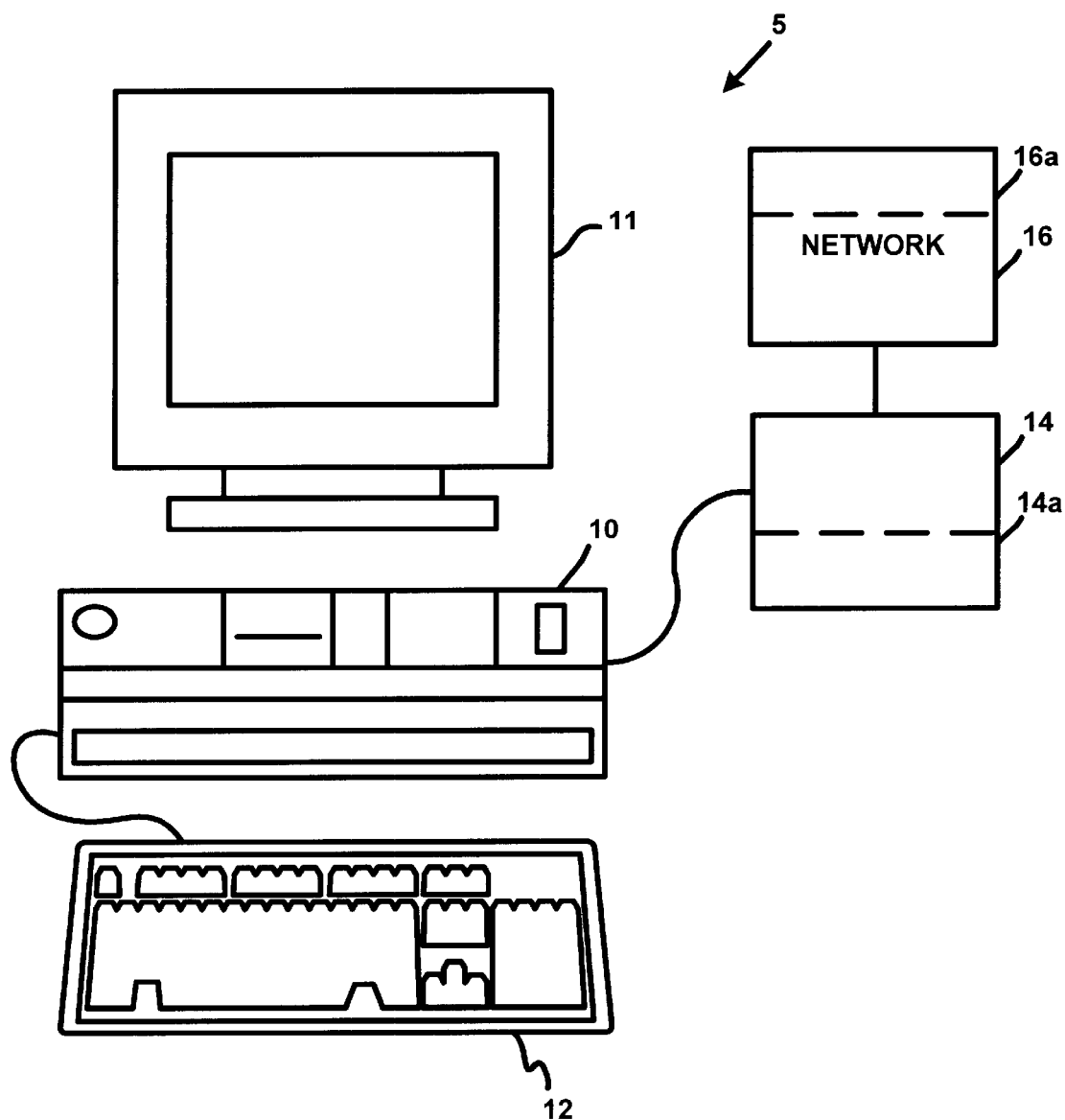
FIG. 1 shows a personal computer terminal useful in the present invention.

FIG. 1 illustrates the environment of the present invention. A personal computer 5 includes a system unit 10, a display or monitor 11 and a keyboard 12. An optional printer may be attached to the personal computer to provide printed output from the personal computer 5. The personal computer 5 is connected to a data transmission network, shown here by the reference numeral 16, through appropriate logical and physical connections, many of which are known and conventional, through a server or router, shown here by the reference numeral 14. The data transmission network 16 is, in turn, connected to other personal computer terminals, other input and output devices and to various servers, none of which are shown in FIG. 1. The server or router 14 includes a stored table of attached terminals and addresses, shown by the reference numeral 14a, and the data transmission network 16 includes a table 16a which has the addresses of the attached servers or routers 14 as well as the individual terminals and their associated server or router. When a personal computer or terminal 5 is moved from one location on one server to another server, the tables at each location must be updated so that data packets can be appropriately routed; that is, any pointers to an old location must be removed so that data is not misdirected when a terminal is removed from the network and the new address provided when the terminal or personal computer is added to the network in a new location.

The personal computer 5 may be any one of a variety of personal computers sold by IBM like the IBM Personal Computer 300 Series, the IBM ThinkPad laptop personal computers or the IBM Aptiva series computer, or it may be one of a variety of personal computers from other manufacturers which use a similar architecture and have become known as IBM clones. The IBM clones may look somewhat different from IBM models in external ornamental appearance and layout of the various components, but functionally are quite similar to the IBM personal computer.

Although the present invention is being described in connection with its preferred embodiment where the personal computer serves as the computer terminal which is connected to the data transmission network, various other computer terminals are known for attaching to networks and serving users as a desktop connection to a data transmission network. For example, display terminals such as the IBM 3278 and 3279 were in long-standing use as terminals for computer networks dating back to before the advent of the personal computers and still are used where the user requires merely a "dumb" terminal, since the 3278 has no permanent storage and only the display as an output device. The present invention could be applied to such dumb terminals with slight modifications so that the terminals can store the values for their settings or attachment parameters. The present invention also has applicability to the so-called "network computers" and may have use in other computer-like instruments connected to networks like cell phones and personal digital assistant (PDA) terminals as well as special purpose terminals like automatic teller machines (ATMs) or terminal devices to connect to networks such as the Internet.

Figure 2:
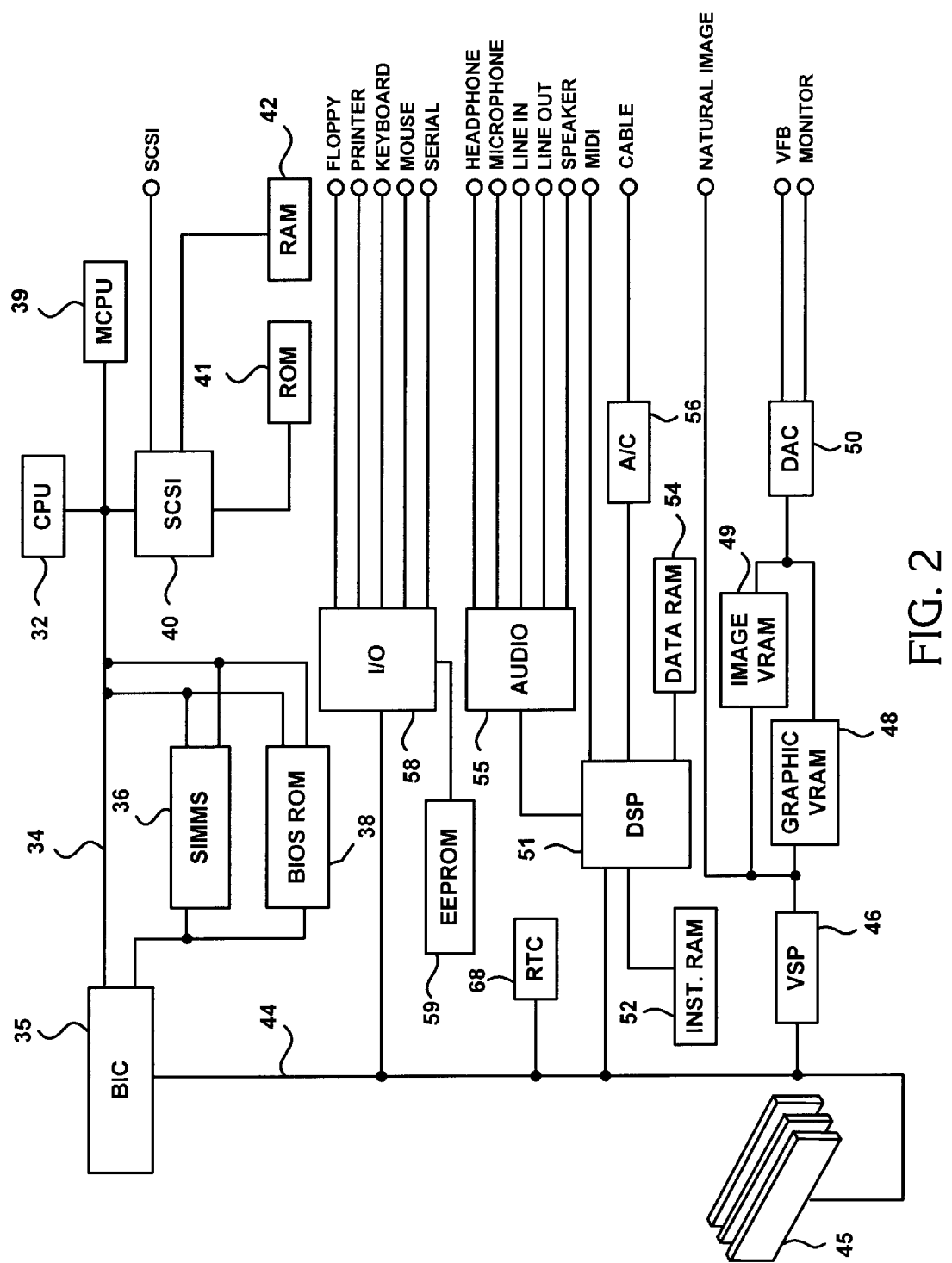
FIG. 2 is a block diagram of certain components of the personal computer of FIG. 1.

FIG. 2 is a block diagram of certain components of the personal computer 5 of FIG. 1. The personal computer 5 includes a central processor 40 which is typically a single chip made either by Intel (such as an Intel Pentium* or Pentium II* processor) or an similar semiconductor chip made by another company with similar characteristics. (Throughout this document, an asterisk * is used to indicated the trademarks of various companies.) The processor 40 is connector to a host bus 42, which is connected to a cache controller 44 and a second controller 46. A PCI bus 50 is connected as is a video controller 56, which is used to drive the display 11. Although the components of the personal computer are not particularly relevant to the present invention, other components of the personal computer are described in detail in various publications on the personal computer, including U.S. Pat. No. 5,341,422 entitled "Trusted Personal Computer System with Identification" to Blackledge et al. and assigned to the assignee of the present invention. The details of the personal computer 5 as provided in the '422 patent are specifically incorporated herein by reference. The personal computer 5 includes memory which stores various information relating to its attachment to the server 14 and to the data transmission network 16, information which is often referred to as settings, and information which may change when the personal computer is moved to a different location on the data transmission network.

Figure 3:
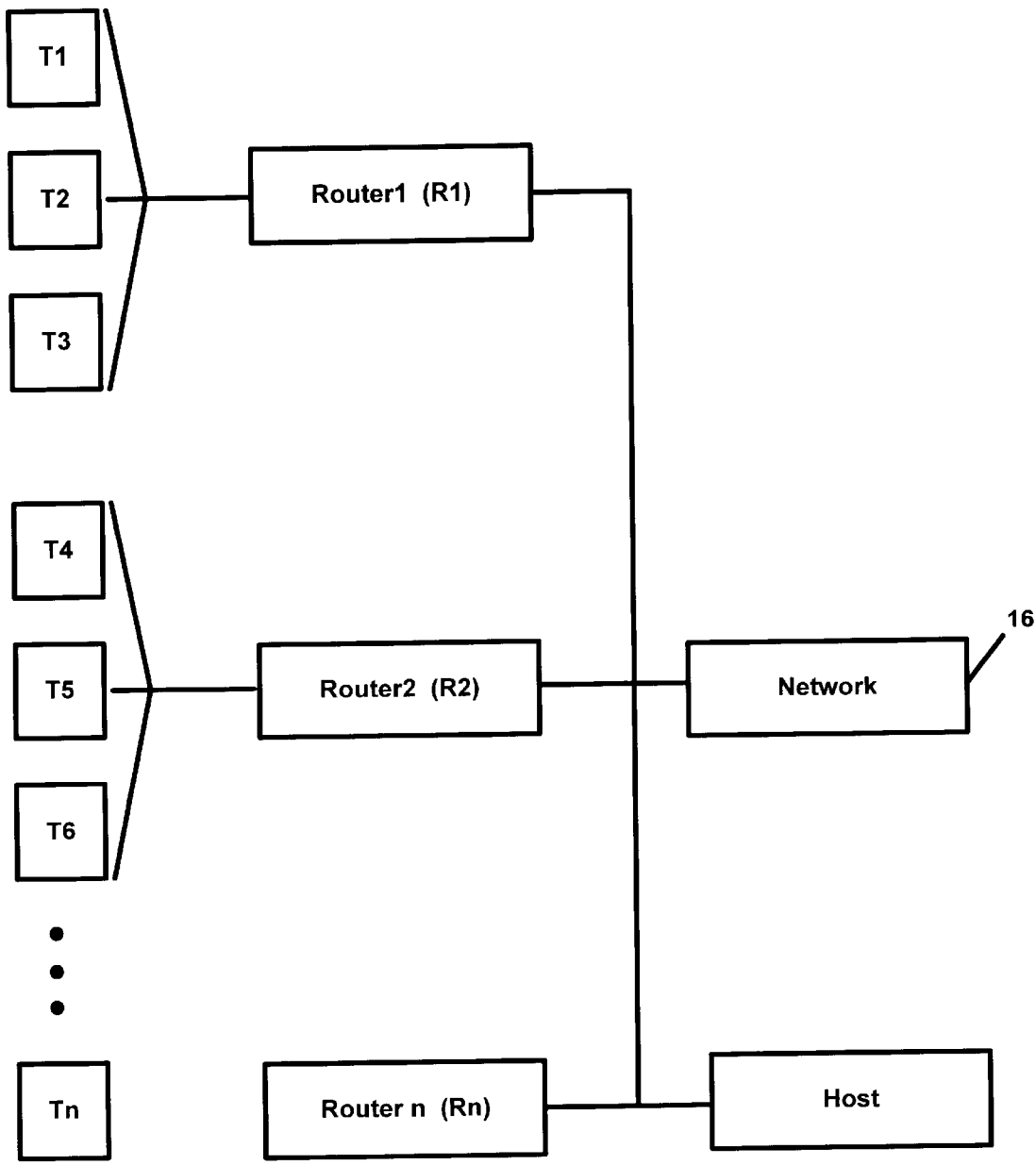
FIG. 3 is a block diagram of a data transmission network of the type using the present invention.

FIG. 3 illustrates, in block diagram form, a portion of a typical data transmission network 16. A plurality of computer terminals designated by T1, T2, T3, T4, T5, T6, and Tn are attached to a selected one of a plurality of servers or data routers R1, R2, Rn in a known manner, such as by cables. The routers R1, R2, Rn are operatively connected to a host H through conventional connections, which may be cables if the host is in the same building or may be telecommunications lines if the host and routers are located in different buildings or even in different cities. The routers are conventional network attachment devices of the type sold by a variety of manufactures such as IBM, Cisco and 3Com and servers are also well known in the trade.

Figure 4:
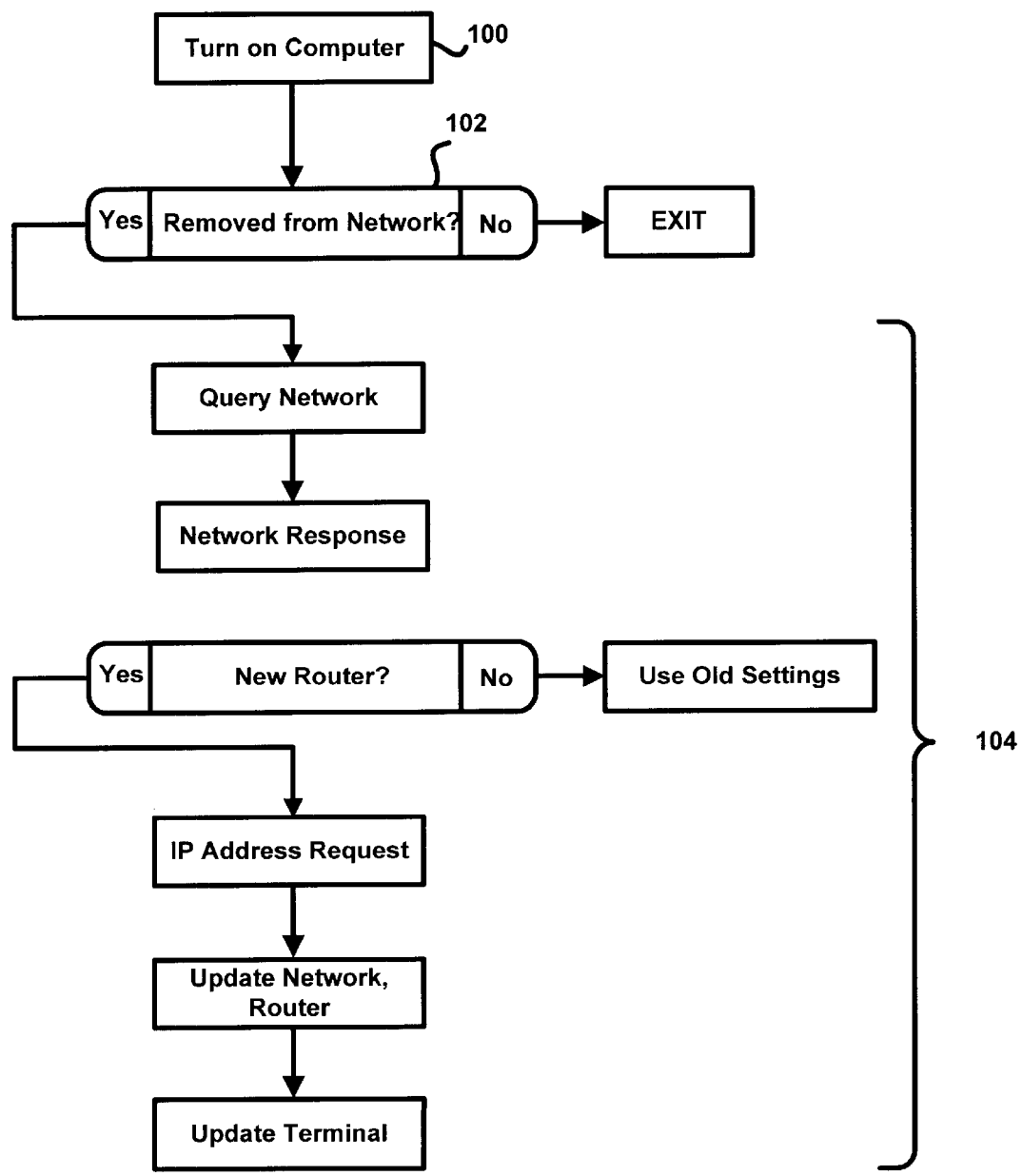
FIG. 4 is a flow chart of the logic of the present invention.

FIG. 4 is a flow chart of the process which uses the present invention to address the configuration of a computer terminal added to a network. Beginning at box 100, a computer terminal attached to a network is turned on. At box 102, it determines whether it has been removed from the data transmission network 16, as by using the IBM Alert on LAN offering which is generally available and which is described to some extent in the LAN Leash Pat. referenced above. A new computer terminal connection to a data transmission network is detected and reported as such when a computer is connected to the data transmission network which had not been in that particular place previously. Although a particular terminal may have been connected to the same data transmission network previously, it may have been in the same place or in a different place.

FIG. 5 is an example of a log which is maintained at the host to keep track of the computer terminals attached to the data transmission network. For each terminal (for example, T1), a line in the log is completed with the location (the address of a physical plug), the current IP address, the router to which each computer terminal is currently attached, the Internet Protocol (IP) address of the primary domain server and the Internet Protocol address of the secondary or alternate domain server. Of course, the log is maintained, in its preferred form, in the form of a relational database (using a program product like IBM's DB2 relational database) which allows additional columns to be added for additional information to be maintained, if desired, such as the type of computer terminal equipment (differences in display size and system capacity and speed may make this useful information to have in some circumstances), encryption information, previous address, etc., according to the needs of the users of the system.

FIG. 6 illustrates the log that is maintained at the terminal. The log includes the current terminal information like current location (physical plug address), router, IP address and effective date (when this location became effective). The log also includes information on past locations of the particular computer terminal, including its immediate past location, the previous location before that, all the way back to the initial location. Each time the computer terminal is moved, the new location information becomes the current location information (by writing a new line in the log) and the information on past locations becomes The steps of the method described in connection with the foregoing invention are capable of being practiced by a programmed processor, with the program being stored on a suitable storage device such as a floppy diskette or a CD ROM or in the memory of a processor. The program may be communicated to the processor for use in a variety of conventional ways. Thus, the present invention contemplates that the steps of the novel method could be stored on a suitable medium and the executed at an appropriate time in response to appropriate circumstances.

Of course, many modifications and adaptations to the preferred embodiment are possible without departing from the spirit of the present invention. For example, the present invention is not considered to be limited to the personal computer which serves as a computer terminal for the data transmission network, but could be used to advantage with other components (like a network computer or a so-called "dumb" terminal) which are similarly attached to and removed from a data transmission network. Further, some of the features of the present invention can be used to advantage without the corresponding use of other features. The logging of data about the terminal's attachment at both the network (or the host or server) and the computer terminal may not be required for all instances. Particularly if both the data transmission network and the computer terminal are available for inquiry, it may not be necessary to store duplicating information about the terminal connections at both the personal computer terminal and the data transmission network. Accordingly, the foregoing description of the present invention should be considered as merely illustrative of principles of the present invention and not in limitation thereof, which is defined solely by the claims which follow.

Having thus described the invention, what is claimed is:

1. A method of reconnecting a computer terminal which supports stored original settings for network connection to a data transmission network, the steps of the method comprising:

storing an indicator in the computer terminal and the data transmission network whenever the computer terminal has been physically disconnected from the data transmission network;

determining upon reconnection of the computer terminal to the data transmission network and in response to the indicator that the computer terminal has been disconnected from the data transmission network, whether original settings stored on the computer terminal are valid for attaching to the network in the location where the computer terminal is being reconnected;

reconnecting the computer terminal using those original settings if the original settings for the computer terminal are valid for attachment to the data transmission network where the computer terminal is being reconnected; and requesting, using a network protocol, a refresh of the original settings if the original settings on the computer terminal are not valid and reconnecting using such refreshed settings for connecting the computer terminal to the data transmission network whereby the computer terminal requests new settings on its own volition and stores the new settings on the computer terminal for connecting the computer terminal to the data transmission network where the computer terminal is being reconnected.

2. A method of attaching a computer terminal to a data transmission network including the steps of claim 1 and further including the step of requesting the new settings from the data transmission network when the settings for the computer terminal are not appropriate for the location where the computer terminal is being connected.

3. A system for connecting a computer terminal to a data transmission network with valid settings for connection thereto, the system comprising:

a sensing module for determining when the computer terminal has been removed from the data transmission network;

a module responsive to the removal of the computer terminal from the network for generating and storing a signal that indicates which computer terminal has been removed from the network;

a module for determining when a computer terminal is reattached to the transmission network and for determining whether the stored settings for the computer terminal are valid for the connection of the terminal at its new location on the network; and logic for testing if the settings are valid for the reconnection on the network, then using those settings if valid; and upon detecting the settings are not valid, obtaining and storing new settings for connection of the computer terminal to the data transmission network at the new connection, whereby the act of requesting new settings is triggered by the computer terminal acting on its own volition only if the old settings are not valid for the new location of the computer terminal on the data transmission network.

4. The method according to claim 1, wherein the step of obtaining and storing new settings if the original settings on the computer terminal are not appropriate for connection of the computer terminal to the data transmission network at the new connection uses a Dynamic Host Connection Protocol (DHCP) program for obtaining a new Internet Protocol (IP) address for connecting the computer terminal to the data transmission network where the computer terminal is being connected.

5. The method according to claim 1, wherein the new settings appropriate for the new connection includes at least an IP address for the computer terminal.

6. The system of claim 3, wherein the act of requesting new settings uses a Dynamic Host Connection Protocol (DHCP) program for obtaining a new Internet Protocol (IP) address for connecting the computer terminal to the data transmission network where the computer terminal is being connected.

7. The system of claim 3, wherein the new settings appropriate for the new connection includes at least an IP address for the computer terminal.

* * * * *